(12) United States Patent
Nonaka et al.

(10) Patent No.: US 8,935,911 B2
(45) Date of Patent: Jan. 20, 2015

(54) FUEL SPRAY APPARATUS FOR GAS TURBINE ENGINE

(75) Inventors: Yoshiharu Nonaka, Kobe (JP);
Masayoshi Kobayashi, Kobe (JP);
Hideki Ogata, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 790 days.

(21) Appl. No.: 12/662,521

(22) Filed: Apr. 21, 2010

(65) Prior Publication Data

US 2010/0269506 A1 Oct. 28, 2010

(30) Foreign Application Priority Data

Apr. 27, 2009 (JP) ................................ 2009-107440

(51) Int. Cl.

| | |
|---|---|
| *F02C 7/232* | (2006.01) |
| *F23R 3/30* | (2006.01) |
| *F23R 3/28* | (2006.01) |
| *F23D 11/38* | (2006.01) |
| *F23R 3/10* | (2006.01) |
| *F23R 3/34* | (2006.01) |
| *F23R 3/50* | (2006.01) |

(52) U.S. Cl.
CPC .............. *F23R 3/283* (2013.01); *F23D 11/386* (2013.01); *F23R 3/10* (2013.01); *F23R 3/343* (2013.01); *F23R 3/50* (2013.01); *F23D 2209/30* (2013.01); *F23D 2214/00* (2013.01); *F23D 2900/00008* (2013.01); *F23D 2900/00018* (2013.01); *Y02T 50/675* (2013.01)
USPC ......................................... 60/39.094; 60/737

(58) Field of Classification Search
USPC ............... 60/39.094, 740, 742, 748, 737, 739
See application file for complete search history.

(56) References Cited

U.S. PATENT DOCUMENTS

| | | | |
|---|---|---|---|
| 6,898,926 B2* | 5/2005 | Mancini | 60/39.094 |
| 2007/0028617 A1* | 2/2007 | Hsieh et al. | 60/737 |
| 2007/0289305 A1* | 12/2007 | Oda et al. | 60/748 |
| 2010/0251719 A1* | 10/2010 | Mancini et al. | 60/737 |

FOREIGN PATENT DOCUMENTS

| | | |
|---|---|---|
| EP | 1 445 539 A1 | 8/2004 |
| EP | 1 445 540 A1 | 8/2004 |

(Continued)

OTHER PUBLICATIONS

Office Action issued in Japanese Patent Application No. 2009-107440 dated Jan. 18, 2011 (with translation).
Oct. 23, 2012 Extended European Search Report in European Patent Application No. 10160751.3.

*Primary Examiner* — Andrew Nguyen
(74) *Attorney, Agent, or Firm* — Oliff PLC (57) ABSTRACT

The present invention provides a fuel spray apparatus for a gas turbine engine, including: a pilot part configured to spray a fuel to be used for a diffusion combustion; a main part provided so as to surround the pilot part and configured to inject a pre-mixed gas only upon a high power operation; and a shield body constituting a purge air passage which is configured to take therein an air flowed on an upstream side relative to a fuel injection port of the main part as a purge air, and to blow off a fuel dripping from the fuel injection port toward a main air passage of the main part. The purge air passage is provided in a position opposite to a main fuel passage communicated with the fuel injection port across the shield body.

4 Claims, 5 Drawing Sheets

(56) References Cited

FOREIGN PATENT DOCUMENTS

| EP | 1 471 308 A1 | 10/2004 |
| JP | A-08-145362 | 6/1996 |
| JP | A-2004-233041 | 8/2004 |
| JP | A-2007-183094 | 7/2007 |

* cited by examiner

FUEL SPRAY APPARATUS FOR GAS TURBINE ENGINE

CROSS REFERENCE TO RELATED APPLICATIONS

This application is based upon and claims the benefit of priority from the prior Japanese Patent Application No. 2009-107440 filed on Apr. 27, 2009, the entire contents of which are incorporated herein by reference.

BACKGROUND OF THE INVENTION

1. Field of the Invention

The present invention relates to a fuel spray apparatus for a gas turbine engine including a staged fuel injector composed of two combustion methods, i.e., a diffusion combustion and a lean-mixture combustion.

2. Background Art

In recent years, reduction of harmful substances, such as nitrogen oxide (NOx) and the like, discharged from a gas turbine has been strictly required for environmental protection. Meanwhile, for the gas turbine, especially for an airplane engine, good altitude relight ability has been required, and thus ability for low-NOx combustion as well as for stabilized combustion has attracted significant attention. Thus, the staged fuel injector composed of a single fuel injector valve incorporating the diffusion combustion system adapted for ensuring the stabilized combustion and the lean-mixture combustion system adapted for substantially reducing the NOx has been prevailed. More specifically, this staged fuel injector includes a pilot fuel supply system and a main fuel supply system, wherein fuel can be supplied from only the pilot fuel supply system or part, upon low power operation, thereby to perform more stabilized combustion under diffusion combustion condition, while the fuel can also be supplied from the main fuel supply system or part, upon high power operation, thereby to further reduce the NOx under lean-mixture combustion.

During a transition from the high power operation to the low power operation in the gas turbine including such a staged fuel injector, the fuel is supplied from only the pilot fuel supply system, while the supply of the fuel from the main fuel supply system is stopped. In order to prevent coking of the fuel remained in a fuel passage of the main fuel supply system (i.e., in a main fuel passage) due to high temperature air fed from a compressor during this transition, a fuel passage portion corresponding to the main fuel passage is covered with a shroud to provide an air heat insulating space or layer between this fuel passage portion and the shroud, or otherwise a separate fuel circuit for always flowing the fuel therethrough is provided to cool the fuel present in the main fuel passage (e.g., JP2007-183094A). However, such countermeasures cannot sufficiently address the problem of the coking as described above. For instance, the fuel remained in the main fuel passage may tend to be pushed out by the air entering the fuel passage and leak into surrounding parts or members, such as the shroud constituting the air heat insulating space. As a result, the fuel that leaks into the shroud will be carbonized due to contact with a high temperature wall of the shroud. Further, if such leakage of the fuel is continued and the amount of the carbonized fuel (or coking) is rather increased, the fuel passage will be connected with the shroud via the so-carbonized fuel, resulting in substantial degradation of the cooling effect due to the air heat insulating space. Thus, such coking of the fuel will be continued until the supply of the fuel from the main fuel supply system is actually stopped. This may cause a serious hindrance to a next injection operation of the fuel (or main fuel) from the main fuel supply system. To address this problem, more positive countermeasures against the unwanted leakage of the fuel into the surrounding members, such as by supplying suitable fluid or gas, e.g., purge air or the like, to the main fuel passage, at the same time that the stop operation of the supply of the main fuel is started, are now being studied.

However, such supply of the purge air as described above requires a high pressure pump, lines, valves and the like, respectively provided for exclusive use, thus inevitably increasing the number of such parts or members, rendering the entire system more complicated and substantially increasing the weight thereof.

SUMMARY OF THE INVENTION

The present invention was made in light of the above problem. Therefore, it is an object of this invention to provide the fuel spray apparatus for the gas turbine engine, which can successfully prevent the coking, while avoiding undue weight increase and complication of the entire system.

To attain the above object, the fuel spray apparatus used for the gas turbine engine according to this invention includes: a pilot part configured to spray the fuel used for the diffusion combustion; a main part provided so as to surround the pilot part and configured to inject a pre-mixed gas only upon a high power operation; and a shield body constituting a purge air passage configured to take therein an air flowed on the upstream side relative to a fuel injection port of the main part as purge air, and to blow off a fuel dripping (i.e., a dripping of the liquid fuel) from the fuel injection port toward a main air passage of the main part, wherein the purge air passage is provided in a position opposite to the main fuel passage communicated with the fuel injection port, across the shield body.

With this configuration, when the supply of the main fuel to the main fuel passage is stopped upon or during the transition from the high power operation to the low power operation, the fuel drippings leaked from the fuel injection port can be blown off toward the main air passage with the purge air. Therefore, the coking caused by such fuel leak can be effectively suppressed. Further, since the air is taken as the purge air into the purge air passage on the downstream side relative to the fuel injection port, there is no need for separately providing equipment exclusively used for taking in or introducing such purge air. Thus, the number of the parts or members to be employed in the apparatus can be substantially reduced, leading to significant reduction of the weight of the apparatus as well as simplification of the structure thereof. Further, since the main fuel passage is heat-insulated from the purge air passage by the shield body, the coking of the fuel in the main fuel passage can be successfully avoided, even though the purge air heated at a relatively high temperature is flowed through the purge air passage.

In this invention, it is preferred that the fuel spray apparatus for the gas turbine engine further includes a shroud covering the main fuel passage and the shield body, wherein the shroud is provided with an intake port and a discharge port for the purge air, and wherein the purge air passage is provided between an inner face of an outer circumferential wall of the shroud and the shield body. With this configuration, the purge air passage can be readily provided between the inner face of the outer circumferential wall of the shroud and the shield body.

Further, it is preferred that a passage area of the intake port for the purge air is greater than a passage area of the discharge port. With this configuration, the flow speed of the purge air in the purge air passage can be adequately increased, thereby effectively blowing off the leaked fuel.

More preferably, the fuel spray apparatus for the gas turbine engine further includes a guide tube provided downstream of the fuel injection port of the main part, such that the fuel dripping can be blown off from the guide tube by the purge air. With this configuration, the fuel can be smoothly introduced from the fuel injection port, due to the guide tube, upon the high power operation, without being leaked into the surrounding parts or members.

In this invention, it is preferred that the guide tube is located at an outer circumference of an annular downstream part of the main fuel passage, wherein the shield body has a spring elasticity whereby the guide tube can be pressed with a spring force against the outer circumferential face of the main fuel passage. With this configuration, the guide tube can be adequately pressed with the spring force against the outer circumferential face of the main fuel passage. Therefore, there is no need for separately providing any support member for supporting the guide tube. As such, the number of the parts and/or members to be incorporated in the apparatus can be substantially reduced, thereby significantly reducing the apparatus weight and simplifying the structure of the apparatus.

More preferably, a pilot fuel passage is provided adjacent to the main fuel passage such that a main fuel can be cooled with a pilot fuel. With this configuration, the main fuel can be cooled with the pilot fuel that is always supplied and flowed through the pilot fuel passage. This can eliminate a need for separately providing a proper cooling means, thus significantly reducing the number of parts and/or members to be incorporated in the apparatus.

According to the fuel spray apparatus for the gas turbine engine of this invention, the fuel drippings leaked from the fuel injection port can be successfully blown off toward the main air passage by the purge air, when the supply of the main fuel to the main fuel passage is stopped, during the transition from the high power operation to the low power operation. Thus, the coking due to the leakage of the fuel can be effectively suppressed. Further, since the air can be taken as the purge air into the purge air passage on the upstream side relative to the fuel injection port, there is no need for providing any equipment exclusively used for introducing the purge air. Therefore, the number of parts and/or members to be incorporated in the apparatus can be substantially reduced, thereby significantly reducing the apparatus weight and simplifying the structure of the apparatus. Furthermore, since the main fuel passage can be well heat-insulated by the shield body, the coking of the fuel remained in the main fuel passage can be successfully avoided, even though the purge air heated at a considerably high temperature is flowed through the purge air passage.

DESCRIPTION OF EMBODIMENTS

Hereinafter, one preferred embodiment will be described with reference to the drawings.

Figure 1:
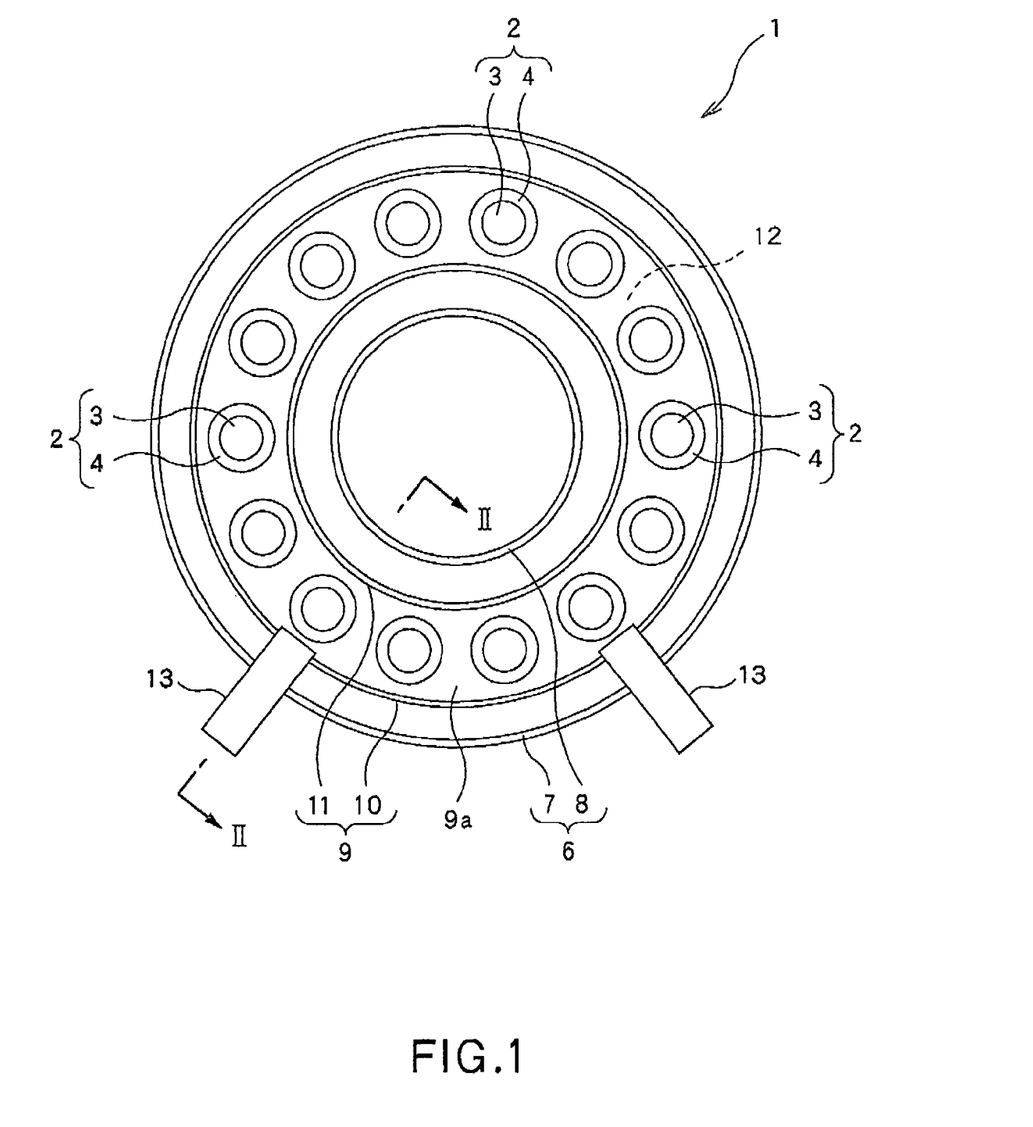
FIG. 1 is a schematic front view showing a combustor of the gas turbine engine including the fuel spray apparatus according to an embodiment of the present invention.

FIG. 1 shows a head portion of the combustor 1 of the gas turbine engine including the fuel spray apparatus 2 according to the embodiment of the present invention. The combustor 1 can serve to mix the fuel with compressed air supplied from a compressor (not shown) of the gas turbine engine and then combust the fuel with the supplied compressed air in order to drive a turbine by feeding high-temperature and high-pressure combustion gas generated by the combustion into the turbine.

In this annular type combustor 1, an annular inner casing 8 is concentrically located inside an annular outer casing 7. These annular casings 7, 8 constitute together a combustor housing 6 having an annular internal space provided therein. Further, in this annular internal space of the combustor housing 6, an annular inner liner 11 is concentrically located inside an annular outer liner 10. These annular liners 10, 11 constitute together a combustion cylinder 9. This combustion cylinder 9 is located concentrically with the combustor housing 6, and includes an annular combustor chamber 12 provided therein. A plurality of fuel injection units 2 (in this embodiment, fourteen (14) fuel injection units 2), respectively adapted for injecting the fuel into the combustion chamber 12, are arranged in a top wall 9a of the combustion cylinder 9, concentrically with the cylinder 9, in a circular line, with an equal interval. Each fuel injection unit 2 includes a pilot part (or pilot fuel injection nozzle) 3 and a main part (or main fuel injection part) 4 provided to concentrically surround the pilot part 3. Such pilot parts 3 and main parts 4 will be detailed later.

Two ignition plugs 13 are respectively extend through the outer casing 7 and outer liner 10, in the radial direction relative to the combustion cylinder 9, with each distal end of these plugs 13 positioned in the vicinity of one of the fuel injection units 2. Accordingly, in this combustor 1, inflammable or burnable mixed gas injected from the two fuel injection units 2 respectively positioned in the vicinity of the two ignition plugs 13 is first ignited, and the flame generated by such ignition is then transferred to the flammable mixed gas injected from each adjacent fuel injection unit 2 from one after another. In this way, such inflammable mixed gas injected from all of the fuel injection units 2 will be eventually ignited.

Figure 2:
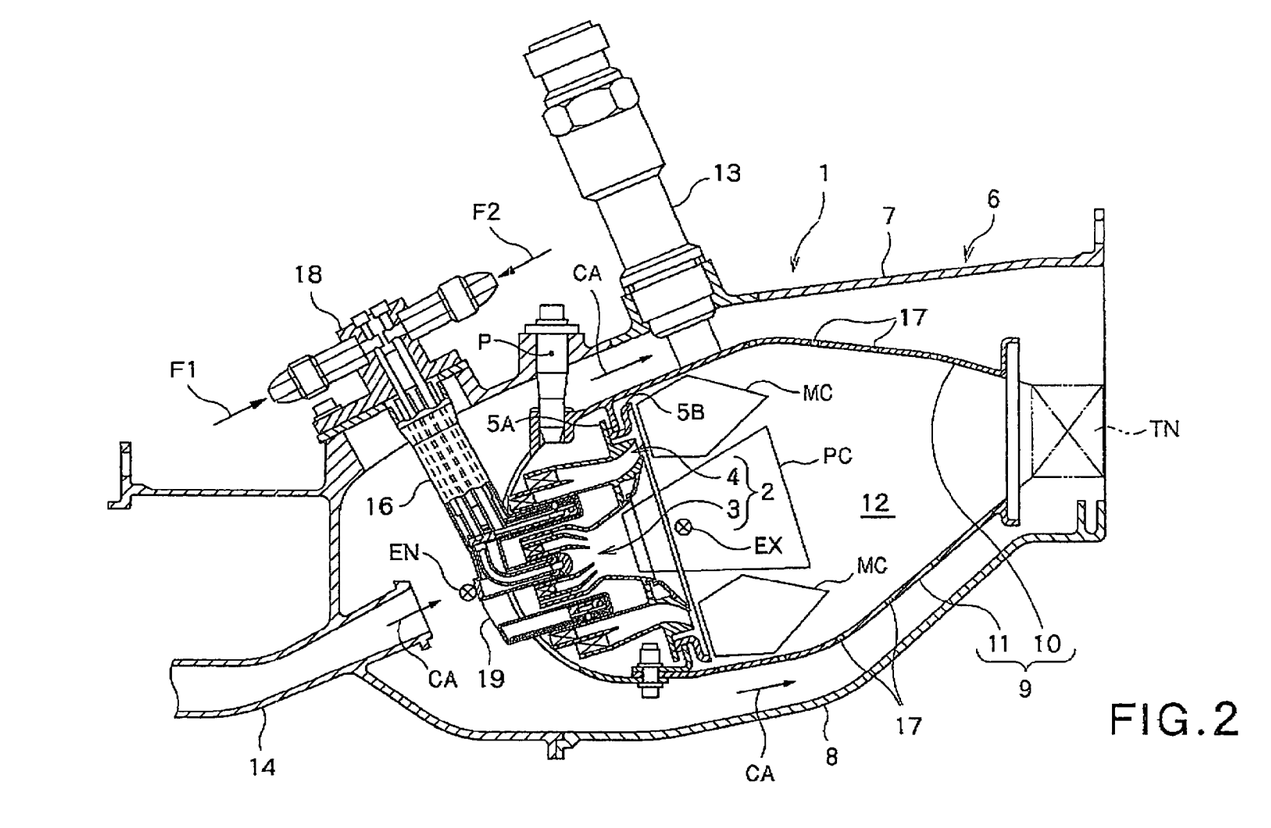
FIG. 2 is an enlarged section taken along line II-II in FIG. 1.

Referring to FIG. 2, in the annular internal space of the combustor housing 6, the compressed air CA fed from the compressor is introduced via a plurality of air intake ducts 14. Then, the so-introduced compressed air CA is supplied to each fuel injection unit 2, while being supplied into the combustion chamber 12 via a plurality of air introducing ports 17, respectively provided in the outer liner 10 and inner liner 11 of the combustion cylinder 9. Further, fuel piping units 18, each including a first fuel supply system F1 adapted for supplying the fuel used for the diffusion combustion to each corresponding pilot part 3 and a second fuel supply system F2 adapted for supplying the fuel used for the lean-mixture combustion to each corresponding main part 4, are supported by the outer casing 7 and connected with a base part 19 of the combustion cylinder 9, respectively. Each fuel injection unit 2 is supported by the outer liner 10, via a flange 5A provided to an outer circumference of the fuel injection unit 2 and a support member 5B provided to the outer liner 10. Further, the outer liner 10 is supported by the outer casing 7, via a stem 16, by means of a liner fixing pin P. A downstream end of the combustion cylinder 9 is connected with a first-stage nozzle TN of the turbine.

Figure 3:
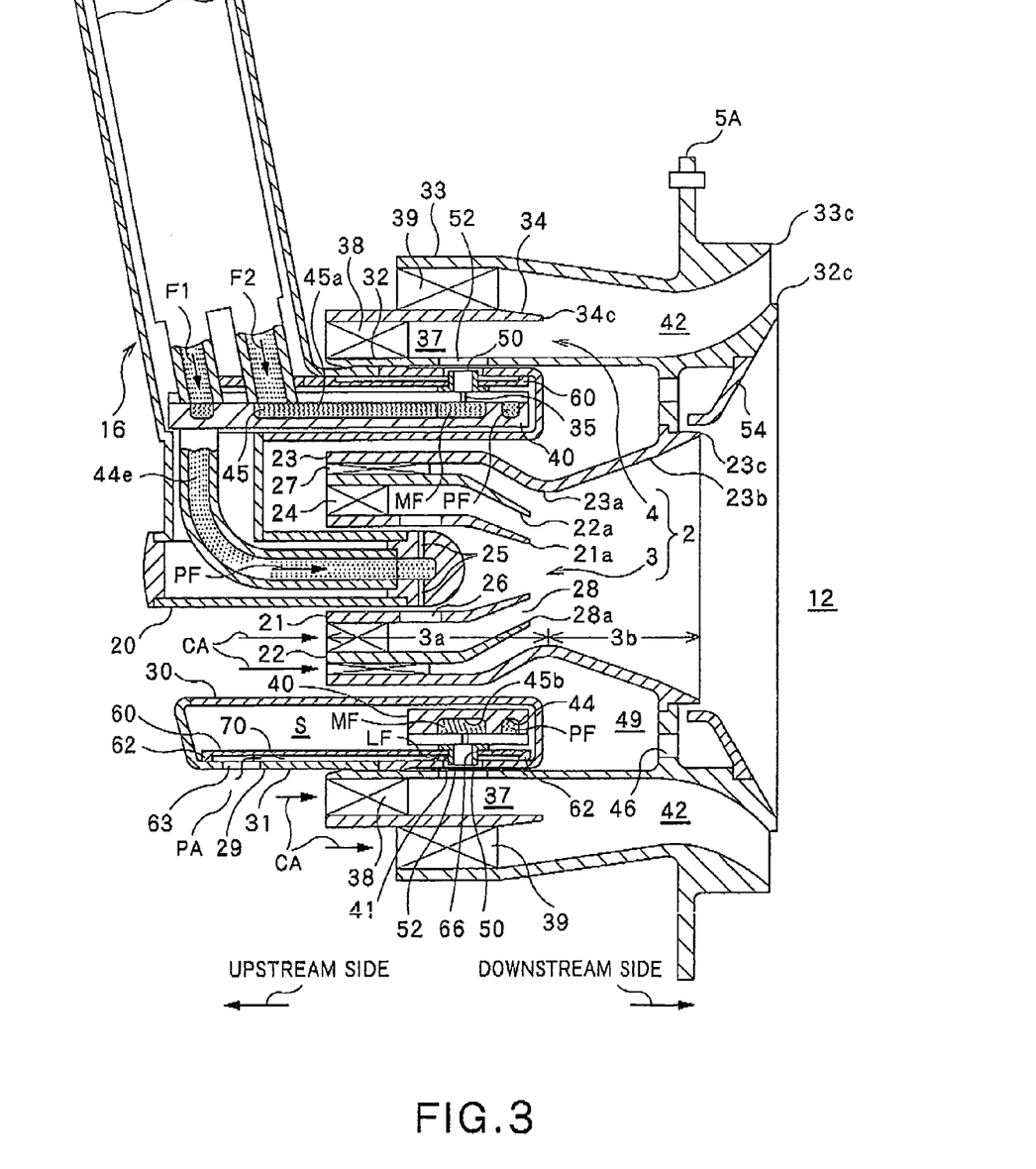
FIG. 3 is an enlarged section for illustrating details of the fuel spray apparatus shown in FIG. 2.

Referring to FIG. 3, the pilot part 3 provided at a central portion of each corresponding fuel injection unit 2 includes a cylindrical main body 20 having a bottom face and adapted for spraying the fuel PF supplied from the first fuel supply system F1 and used for the diffusion combustion, a tubular inner wall 21 externally fitted around the main body 20, a tubular intermediate wall 22 located externally and concentrically relative to the tubular inner wall 21, a nozzle body 23 having a venturi-nozzle shape and located externally and concentrically relative to the tubular intermediate wall 22, a first inner swirler 24 located between the tubular inner wall 21 and the tubular intermediate wall 22, and a first outer swirler 27 located between the tubular intermediate wall 22 and the nozzle body 23.

At a downstream end of the main body 20, a plurality of fuel injection ports 25 are radially provided for respectively injecting the fuel PF supplied into the main body 20, radially outward. Further, fuel introducing ports 26 are provided in the tubular inner wall 21, in positions thereof, respectively corresponding to the fuel injection ports 25. Each of the fuel introducing ports 26 can serve to introduce the fuel PF into a primary atomizing passage 28 provided between the tubular inner wall 21 and the tubular intermediate wall 22. In this case, the fuel PF introduced into the primary atomizing passage 28 is injected from an atomized-fuel injection port 28a located at a downstream end of the passage 28.

The atomized-fuel injection port 28a or respective downstream ends of the tubular inner wall 21 and tubular intermediate wall 22 are located in substantially the same position in an axial direction (or lateral direction in the drawing) as the position of a narrowed portion 23a of the nozzle body 23, at which the internal diameter of the nozzle body 23 is minimized. Meanwhile, a diametrically widened portion 23b of the nozzle body 23 on the downstream side relative to the narrowed portion 23a is formed into an unfolded fan shape. Namely, one portion of the pilot part 3 extending from the upstream end of the pilot part 3 to the narrowed portion 23a of the nozzle body 23 constitutes a fuel atomizing part 3a, and the other portion of the pilot part 3 extending from the narrowed portion 23a to the downstream end 23c of the nozzle body 23, i.e., the diametrically widened portion 23b of the nozzle body 23 constitutes a diffusion passage part 3b. Further, in the fuel atomizing part 3a, respective downstream portions 21a, 22a of the tubular inner wall 21 and tubular intermediate wall 22 constituting together the primary atomizing passage 28 are formed into a tapered truncated-cone shape, corresponding to the shape of a point of the nozzle body 23 facing to these portions 21a, 22a. Thus, with this configuration, the fuel atomizing part 3a can inject the fuel PF and compressed air CA respectively supplied from the primary atomizing passage 28 and first outer swirler 27, obliquely, toward the central axis of the main body 20 in a layered form. Meanwhile, the diffusion passage part 3b located on the downstream side of the fuel atomizing part 3a can serve to inject the fuel PF and compressed air CA into the combustion chamber 12, at an injection angle determined by the diametrically widened portion 23b, while diffusing the fuel PF with the compressed air CA.

In this pilot part 3, the fuel PF used for the diffusion combustion is supplied into the fuel atomizing part 3a from the first fuel supply system F1, over all load (or intensity) range of the starting and low power operation (lower than 50% of the full load) as well as the high power operation (higher than 50% of the full load), and subjected to primary atomization with the compressed air CA, in the fuel atomizing part 3a. Subsequently, in the diffusion passage part 3b, the fuel PF is further subjected to secondary atomization with swirling air flow supplied from the first outer swirler 27. With this secondary atomization, the fuel is changed into a fog state and sprayed into the combustion chamber 12, thereby to form a diffusion combustion region PC in the combustion chamber 12.

Next, the main part 4 surrounding the outer circumference of each corresponding pilot part 3 will be described. This main part 4 includes an annular shroud 29 located externally and concentrically with the nozzle body 23, a tubular intermediate wall 32 located externally and concentrically with the shroud 29, a tubular outer circumferential wall 33 located externally and concentrically with the tubular intermediate wall 32, a cylindrical partition wall 34 provided for partitioning the tubular intermediate wall 32 and the tubular outer circumferential wall 33, a second inner swirler 38 located at an inlet of a pre-mixing preparatory chamber 37 provided between the tubular intermediate wall 32 and the cylindrical partition wall 34, and a second outer swirler 39 provided between the cylindrical partition wall 34 and the tubular outer circumferential wall 33. The shroud 29 has a substantially rectangular longitudinal section including the axis thereof, and includes an inner circumferential wall 30 radially facing an outer circumferential face of the nozzle body 23, and an outer circumferential wall 31 radially facing an inner circumferential face of the tubular intermediate wall 32. Further, the shroud 29 is connected with the stem 16.

In the stem 16 and rectangular shroud 29, the fuel passage 40 is stored, while being attached to the fuel piping unit 18, with a space provided between the fuel passage 40 and the shroud 29. Namely, the shroud 29 covers the fuel passage 40, via the heat insulating space S provided for serving as an air heat insulating layer.

Figure 4:
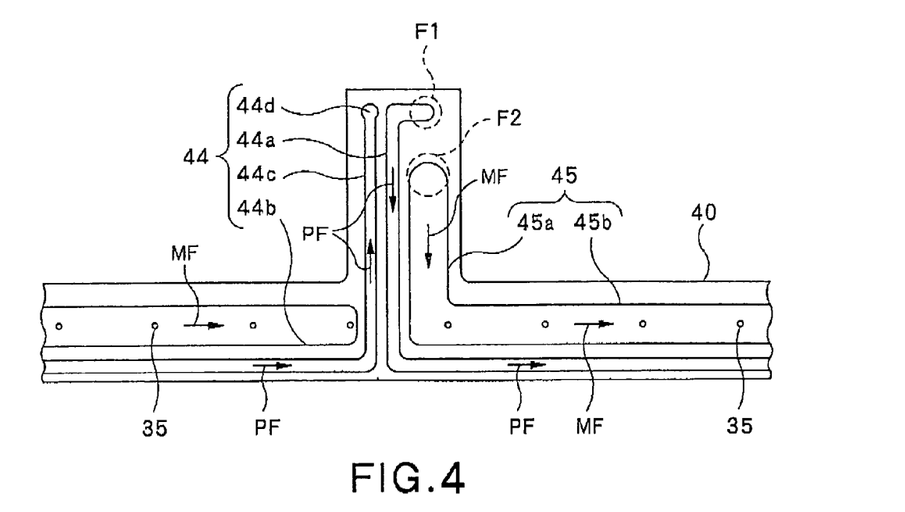
FIG. 4 is a development elevation of the fuel passages in the fuel spray apparatus shown in FIG. 2.

As shown in FIG. 4, in the fuel passage 40, a pilot fuel passage 44 connected with the first fuel supply system F1 and a main fuel passage 45 connected with the second fuel supply system F2 are provided, respectively. The pilot fuel passage 44 includes a pilot introducing passage 44a linearly extending along the axial direction of the fuel spray apparatus 2, a pilot annular passage 44b located on the downstream side relative to the pilot introducing passage 44a, and a linear return passage 44c extending in parallel with the pilot introducing passage 44a. In this case, the pilot annular passage 44b is connected with the return passage 44c, as shown in FIG. 4, while running substantially around the pilot part 3 shown in FIG. 3. A downstream end 44d of the return passage 44c is connected with a fuel introducing passage 44e shown in FIG. 3, such that the fuel PF can be supplied to each fuel injection port 25 of the pilot part 3 from the fuel introducing passage 44e.

The main fuel passage 45 includes a main fuel introducing passage 45a linearly extending along the axial direction of the fuel spray apparatus 2 and a main annular passage 45b located on the downstream side relative to the main fuel introducing passage 45a. The main annular passage 45b is provided to run substantially around the main part 4, as shown in FIG. 3. A plurality of (e.g., eight) fuel injection ports 35 are opened in the middle of the main annular passage 45b constituting a downstream part of the main fuel passage 45. The pilot introducing passage 44a and main fuel introducing passage 45a, and the pilot annular passage 44b and main annular passage 45b are respectively positioned close to each other. With this configuration, upon the low power operation, i.e., when the supply of the main fuel MF is stopped, the main fuel MF remained in the main fuel passage 45 can be cooled with pilot fuel PF flowed through the pilot annular passage 44b.

Now, returning to FIG. 3, the fuel injection ports 35 are respectively formed in the main part 4 circumferentially and radially relative to the main part 4 with an equal interval. An outlet or radially outward end of each fuel injection port 35 is connected with a guide tube 50. This guide tube 50 constitutes a passage extending in the radial direction. Further, an outlet or radially outward end of each guide tube 50 is communicated with an outlet 41 provided in the outer circumferential wall 31 of the shroud 29. In the tubular intermediate wall 32, fuel introducing ports 52 are provided for introducing the fuel MF injected from each guide tube 50 into the pre-mixing preparatory chamber 37, respectively. With this configuration, the fuel MF injected from each fuel injection port 35 can be guided into the pre-mixing preparatory chamber 37 through each corresponding guide tube 50, outlet 41 and fuel introducing port 52. The means for fixing or supporting each guide tube 50 will be described later.

The tubular intermediate wall 32 is provided to cover about half a downstream part of the outer circumferential wall 31 of the shroud 29. A downstream end 32c of the tubular intermediate wall 32 is axially positioned to be projected downstream relative to the downstream end 23c of the nozzle body 23 of the pilot part 3, while constituting a pre-mixing chamber 42 provided between such a downstream end 32c and the tubular outer circumferential wall 33. Between the downstream end 23c of the nozzle body 23 and the downstream end 32c of the tubular intermediate wall 32, a separator 54 for separating the diffusion combustion region PC to be created in the pilot part 3 from a pre-mixing combustion region MC is located.

The position of the upstream end of the cylindrical partition wall 34 is axially coincident with the upstream end of the tubular intermediate wall 32, while the axial length of the cylindrical partition wall 34 is set, such that the downstream end 34c of the wall 34 is positioned on the downstream side by a predetermined distance relative to each fuel introducing port 52. The upstream end of the tubular outer circumferential wall 33 is axially positioned downstream relative to the upstream end of the cylindrical partition wall 34, while the position of the downstream end 33c of this wall 33 is substantially coincident in the axial direction with the downstream end 32c of the tubular intermediate wall 32.

An inner heat shield 60 constituting an annular shield body is located between the inner face of the outer circumferential wall 31 of the shroud 29 and an outer circumferential face of the fuel passage 40. Further, a purge air passage 70 is provided between the inner heat shield 60 and the outer circumferential wall 31 of the shroud 29. Namely, the fuel passage 40 incorporating the main fuel passage 45 and the inner heat shield 60 are covered with the shroud 29, while the purge air passage 70 is located inside the shroud 29 in a position opposite to the main fuel passage 45 across the inner heat shield 60.

Figure 5:
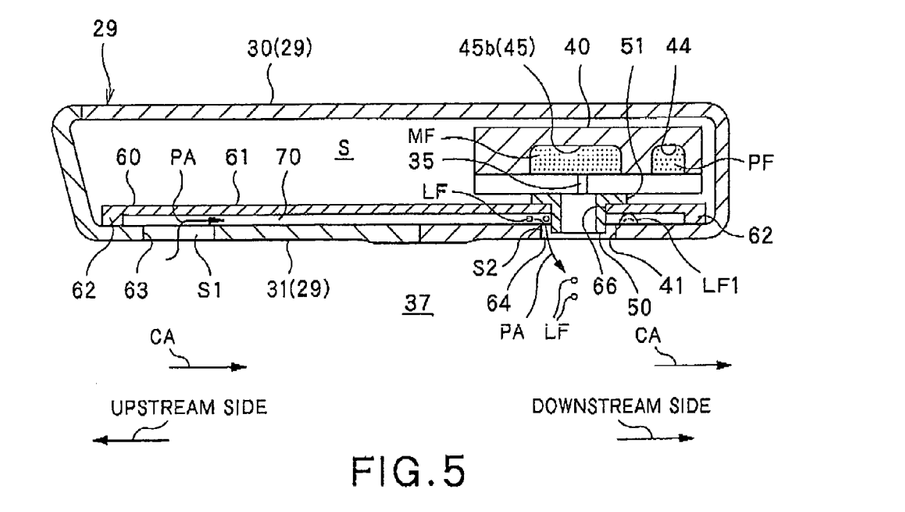
FIG. 5 is an enlarged section for illustrating details of a main part of the fuel spray apparatus shown in FIG. 2.

As shown in FIG. 5 in more detail, the inner heat shield 60 has a cylindrical main body 61 having two projections 62, 62, respectively provided at the upstream and downstream ends thereof and projected radially outward. In addition, the inner heat shield 60 has a through-hole 66 provided for allowing the guide tube 50 to extend therethrough in a position corresponding to the fuel injection hole 35. In this case, the inner heat shield 60 is formed from a metal, such as spring steel or the like, having suitable spring elasticity. However, it is noted that the material used for forming the inner heat shield 60 is not limited to such a metal. Namely, this material can be optionally selected, depending on the environmental conditions, such as, the temperature or the like, under which the inner heat shield 60 is used. In any case, however, this inner heat shield 60 can serve to firmly press a flange 51 provided at an upstream end of the guide tube 50 against an outer circumferential face of the fuel passage 40 by the spring elastic force thereof, with the projections 62 of the shield 60 respectively contacted with the Inner face of the outer circumferential wall 31 of the shroud 29 and a distal end of the guide tube 50 extending through the through-hole 66. In this manner, the purge air passage 70 is formed between the outer circumferential wall 31 of the shroud 29 and the main body 61 of the inner heat shield 60, with both of the upstream and downstream ends thereof being closed by the projections 62.

On the upstream side of the outer circumferential wall 31 of the shroud 29, an air intake port 63 for introducing air into the purge air passage 70 is provided. This air intake port 63 is provided in the same position, in the circumferential direction, as the position of the outlet 41 provided on the downstream side of the outer circumferential wall 31 of the shroud 29. An annular gap is provided between an inner circumferential face of the outlet 41 and an outer circumferential face of the guide tube 50 and constitutes a discharge port 64 for discharging the air. Namely, if the guide tube 50 is not provided, the entire body of the outlet 41 will constitute the discharge port 64. The air intake port 63 is positioned on the upstream side relative to the swirler 38 (FIG. 3), while the discharge port 64 is positioned on the downstream side relative to the swirler 38. Each of the air intake port 63 and outlet 41 is composed of a through-hole having a circular section. The passage area S1 of the air intake port 63 is set to be larger than the passage area S2 of the annular discharge port 64. Preferably, the passage area S1 of the intake port 63 is 1.5 to 3.0 times the passage area S2 of the discharge port 64. It is noted that the shape of such through-holes is not limited to the circle. For instance, either one or both of these holes may be a polygonal shape.

Only upon the high power operation higher than 50% relative to the full load operation, the fuel MF is supplied to the main part 4 shown in FIG. 2 from the second fuel supply system F2. Subsequently, the fuel MF is fed through the main fuel introducing passage 45a and main annular passage 45b respectively shown in FIG. 3, and then injected into the pre-mixing preparatory chamber 37 after flowed through the fuel injection port 35, guide tube 50, outlet 41 and fuel introducing port 52. Thereafter, the so-injected fuel MF is mixed with the compressed air CA supplied from the second inner swirler 38, and then such mixed gas is further mixed, in the pre-mixing chamber 42, with the swirled air flow supplied from the second outer swirler 39. In this way, pre-mixed gas, in which the fuel F and the compressed air CA are well mixed together, can be produced. Thereafter, this pre-mixed gas is supplied into the combustion chamber 12 shown in FIG. 2 and combusted therein, thus creating the pre-mixing combustion region MC (FIG. 2).

Upon the low power operation in which the fuel F is not supplied to the main part 4, the compressed air CA is introduced into the pre-mixing preparatory chamber 37 and pre-mixing chamber 42 through the respective swirlers 38, 39. Thus, in this case, the swirlers 38, 39 can serve as a main air passage, respectively. With the flow of such compressed air CA, some difference in the pressure will, be generated, between the upstream side and the downstream side, across the swirler 38. Further, with this pressure difference, as shown in FIG. 5, relatively high-pressure air on the upstream side is first taken in, as the purge air PA, from the air intake port 63 of the shroud 29, then flowed through the purge air passage 70 between the inner heat shield 60 and the shroud 29, thereafter flowed into the respective main air passages 37, 42 shown in FIG. 3 from the outlet 41 of the shroud 29, and finally supplied into the combustion chamber 12 together with the compressed air CA flowed through the respective swirlers 38, 39.

An air accumulation chamber 49 is provided between the nozzle body 23 of the pilot part 3 and the tubular intermediate wall 32, and an air inlet port 46 of the separator 54 is communicated with the air accumulation chamber 49. With this configuration, the compressed air CA accumulated in the air accumulation chamber 49 can be injected toward a boundary between the diffusion combustion region PC and the premixing combustion region MC via the air inlet port 46, thereby enhancing and ensuring separation between the two combustion regions PC and MC.

With the above configuration, upon the starting and low power operation of the combustor 1, the fuel PF is supplied to only the pilot part 3 located inside the fuel spray apparatus 2 from the first fuel supply system F1. Then, the fuel PF is injected into the combustion chamber 12, while being diffused and spread together with the compressed air CA by the unfolded-fan-shaped diffusion passage part 3b of the pilot part 3. This can facilitate and stabilize the combustion of the fuel in the diffusion combustion region PC. Meanwhile, upon the high power operation, the pilot fuel PF and main fuel MF are supplied to the pilot part 3 and main part 4, respectively. In the main part 4, as shown in FIG. 5, the guide tube 50 is provided on the downstream side relative to the fuel injection port 35. Therefore, the main fuel MF can be injected smoothly into the pre-heating preparatory chamber 37, through the guide tube 50, without being leaked into the air heat insulating layer S.

However, when the supply of the main fuel MF to the main part 4 is stopped during the transition from the high power operation to the low power operation, the main fuel ME tends to be leaked because of the air entering the main fuel passage 45 after flowed through the fuel injection port 35 and the guide tube 50. Further, such leakage of the main fuel MF tends to generate fuel drippings (i.e., drippings of the liquid fuel) LF on an inner wall of the outer circumferential wall 31 of the shroud 29. Thus, such fuel drippings LF may tend to be carbonized (or changed into the coking) by the surrounding high temperature environment. In particular, in each fuel injection port 35 located at an upper portion of the main part 4, the fuel drippings LF are likely to enter the purge air passage 70 due to the gravitation (note: FIG. 5 shows one fuel injection port 35 located at a lower portion of the main part 4). In this embodiment, however, even such fuel drippings LF having some tendency to enter the purge air passage 70 can be blown off toward the main air passages 37, 42 (see FIG. 3), due to the purge air PA. Therefore, the coking that may be otherwise caused by such fuel drippings LF can be successfully prevented. Meanwhile, if some coking (or carbonized fuel) LF1 of the fuel drippings LF is accumulated in the purge air passage 70, such coking LF1 would bring the inner face of the outer circumferential wall 31 of the shroud 29 into contact with the inner heat shield 60, thus unduly rising the temperature of the fuel passage 40 due to the high temperature purge air PA flowed through the purge air passage 70. This phenomenon would lead to further coking of the main fuel MF stopped in the main annular passage 45b. However, in this embodiment, with the configuration for positively removing the fuel drippings LF as described above, such unwanted occurrence or generation of the coking can be securely prevented.

Since the air can be taken, as the purge air PA, into the purge air passage 70 on the upstream side relative to the fuel injection port 35, there is no need to prepare separate equipment exclusively used for the introduction of such purge air PA. Therefore, undue increase of the number of parts or members incorporated in this apparatus can be well controlled, thus substantially reducing the weight of the apparatus and simplifying the structure thereof. Further, the provision of the inner heat shield 60 can adequately insulate the main fuel passage 45 from the environmental heat. Therefore, even though the high temperature purge air PA is used, the occurrence of the coking of the fuel MF remained in the main fuel passage 45 can be successfully prevented.

In addition, the arrangement of the intake port 63 and discharge port 64 for the purge air PA to the shroud 29 covering the main fuel passage 45 and inner heat shield 60 as well as the positioning of the purge air passage 70 between the inner face of the outer circumferential wall 31 of the shroud 29 and the inner heat shield 60 can facilitate the provision of such a purge air passage 70 between the inner face of the outer circumferential wall 31 of the shroud 29 and the inner heat shield 60.

Further, since the passage area S1 of the intake port 63 for the purge air PA is set to be greater than the passage area S2 of the discharge port 64, the flow speed of the purge air PA in the purge air passage 70 can be substantially increased, thus securely enabling the fuel drippings LF to be effectively blown off.

Since the guide tube 50 can be firmly pressed against the outer circumferential face of the main fuel passage 45 with the spring biasing force or elasticity of the inner heat shield 60, there is no need for separately providing a proper support member for supporting the guide tube 50. Therefore, the number of the parts or members used in the apparatus can be further reduced, thus significantly reducing the weight and simplifying the structure of the apparatus.

Further, since the main fuel MF can be cooled with the pilot fuel PF that is always supplied in the fuel passage 40, there is no need for providing a separate cooling means, thereby further controlling the increase of the number of the parts or members to be incorporated in the apparatus.

In order to evaluate an actual effect of this invention, existence of the fuel drippings LF of the main fuel MF upon the stop operation of the fuel supply to the main part 4 has been inspected with eyes, while the fuel is supplied to both of the pilot part 3 and main part 4.

As a result, in a comparative model in which the purge air PA is not introduced into the shroud 29, the fuel drippings LF was found in the shroud after the fuel supply to the main part 4 was stopped. Meanwhile, in a model according to the above embodiment, the fuel drippings LF were securely blown off by the purge air PA, as such the existence of the fuel drippings were not found.

Figure 6:
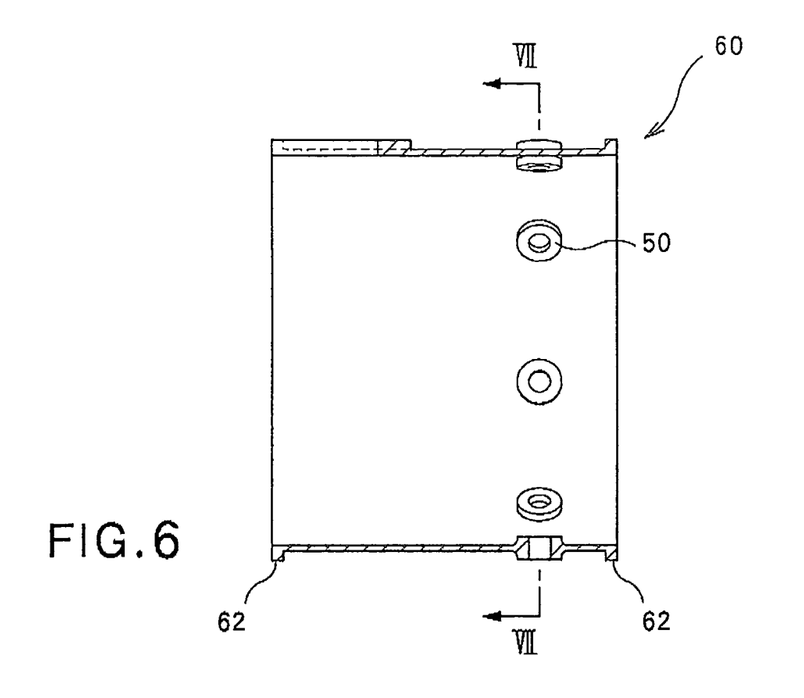
FIG. 6 is a side view of a variation of an inner heat shield in the fuel spray apparatus shown in FIG. 2.
Figure 7:
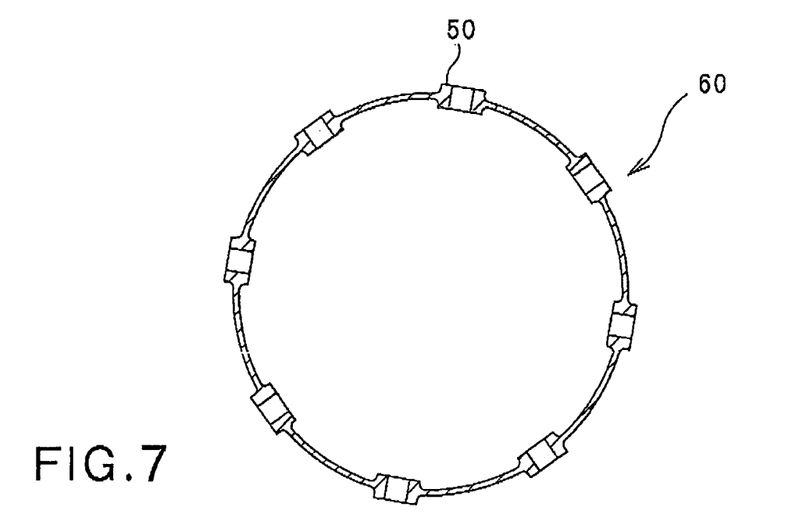
FIG. 7 is a section taken along line VII-VII in FIG. 6.

FIG. 6 is an exemplary side view of one variation of the inner heat shield 60, and FIG. 7 is the section taken along line VII-VII in FIG. 6. In this variation, the inner heat shield 60 is provided integrally with the guide tubes 50. According to this variation, the number of the parts or members can be further reduced, thereby significantly simplifying the structure of the apparatus and adequately controlling the man-hour for assembly and production cost.

As stated above, the preferred embodiment has been described with reference to the drawings. However, it should be understood that various additions, modifications and deletions can be made to this embodiment, without departing from the scope and spirit of the invention. Therefore, it should be construed that such additions, modifications and deletions also fall within the scope of this invention.

The invention claimed is:

1. A fuel spray apparatus for a gas turbine engine, comprising:
   a pilot part configured to spray fuel to be used for a diffusion combustion;
   a main part provided so as to surround the pilot part and configured to inject a pre-mixed gas only upon a high power operation;
   a shield body constituting a purge air passage which is configured to take therein an air flowed on an upstream side relative to a fuel injection port of the main part as a purge air, and to blow off a fuel dripping from the fuel injection port toward a main air passage of the main part;
   a guide tube provided downstream of the fuel injection port of the main part and connected with a radially outward end of the fuel injection port, such that the purge air passes through the outside of the guide tube and the fuel dripping can be blown off from the guide tube by the purge air; and
   wherein the purge air passage is provided in a position opposite to a main fuel passage communicated with the fuel injection port across the shield body,
   wherein a heat insulating space is provided between the main fuel passage and the shield body, wherein an internal diameter of the guide tube is larger than a diameter of the fuel injection port,
   a shroud covering the main fuel passage and the shield body,
   wherein the shroud is provided with an intake port and a discharge port for the purge air, wherein the purge air passage is provided between an inner face of an outer circumferential wall of the shroud and the shield body, and
   wherein the shroud comprises a wall having an upstream end and a downstream end, the intake port and the discharge port being located between the upstream end and the downstream end of the wall.

2. The fuel spray apparatus for the gas turbine engine according to claim 1, wherein a passage area of the intake port for the purge air is greater than a passage area of the discharge port.

3. The fuel spray apparatus for the gas turbine engine according to claim 1, wherein the guide tube is located at an outer circumference of an annular downstream part of the main fuel passage, and wherein the shield body has a spring elasticity whereby the guide tube can be pressed with a spring force against an outer circumferential face of the main fuel passage.

4. The fuel spray apparatus for the gas turbine engine according to claim 1, wherein a pilot fuel passage is provided adjacent to the main fuel passage such that a main fuel can be cooled with a pilot fuel.

* * * * *